Jan. 26, 1965  W. M. DUNN  3,167,364
DOUBLE ROW BALL BEARING ASSEMBLY
Filed Jan. 9, 1962
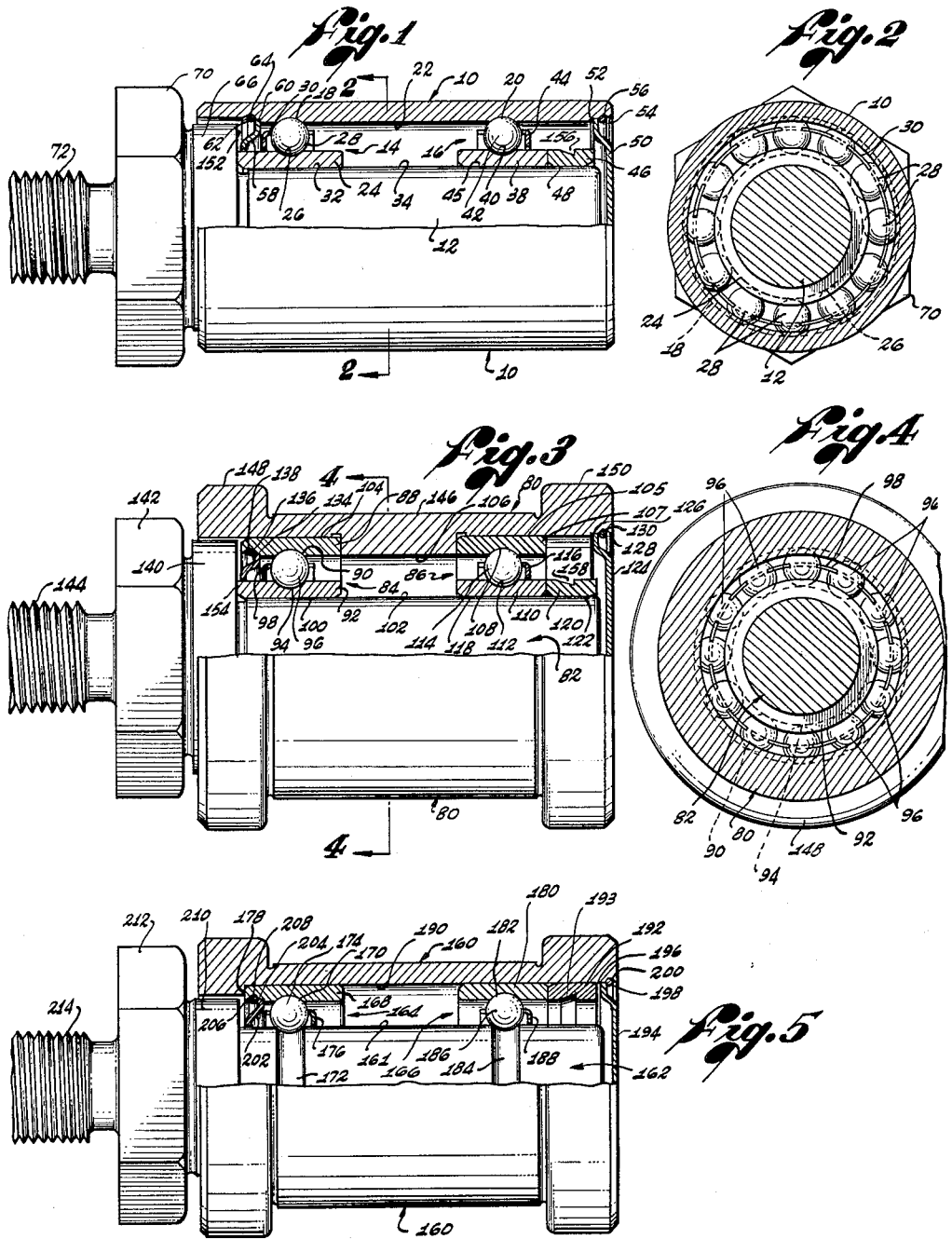
INVENTOR.
WILLIAM M. DUNN
BY
ATTORNEYS United States Patent Office 3,167,364
Patented Jan. 26, 1965

3,167,364
DOUBLE ROW BALL BEARING ASSEMBLY
William M. Dunn, West Covina, Calif., assignor to Federal-Mogul-Bower Bearings, Inc., Detroit, Mich., a corporation of Michigan
Filed Jan. 9, 1962, Ser. No. 165,169
8 Claims. (Cl. 308—189)

This invention relates to bearings for rotatable machine elements, and more particularly to low friction ball bearing assemblies where precise control of concentricity and end play are required.

In certain types of rotating mechanisms, extreme freedom from both eccentricity and end play are required. For example, in tape guidance mechanisms of tape recorders, particularly video tape recorders, the slightest erratic movement of the tape either laterally or in speed variation results in effects which are determimental to the quality of the recorded and reproduced signal. It has been found that to avoid such detrimental effects, the recording tape guidance rollers, over which the tape passes to and from the recording head mechanism, must exhibit very low rotational torque, while at the same time be as free of rotational eccentricity, misalignment, and both axial and radial play as is possible to obtain.

Heretofore, attempts have been made to mount such tape guidance rollers and the like rotative elements on plain bearings, pivot type bearings, and ball bearings of more or less conventional design. In the case of plain bearings, the rotational friction is too great. In the case of pivot type bearings, the desirable qualities of freedom from eccentricity and end and radial play are initially good, but deteriorate almost immediately due to the inherent lack of durability of this type of bearing. In the employment of conventional ball bearings, rotational frictional characteristics were most satisfactory, but due to certain well known constructional requirements for the practical manufacture and assembly of the parts of such ball bearings, lateral wobble and vibration and considerable radial and axial play of the inner and outer bearing ball race rings relative to one another is normally inherent. The latter undesirable bearing characteristics are particularly difficult of elimination and require for such elimination a special technique, where the bearings involved fall within the miniature size category, such as is necessary in connection with the before mentioned tape of guidance mechanisms.

It is, therefore, an object of this invention to provide a ball type bearing assembly embodying means for precise control of the amount of radial and axial play.

It is also an object of this invention to provide a low friction bearing assembly having substantial freedom from rotational eccentricity and misalignment.

It is a further object of this invention to provide a bearing assembly, the relatively rotative parts of which are mounted on low friction ball bearings of substantially conventional type, but which, in the assembly, exhibit extremely precise concentricity and freedom from significant radial and end play.

It is a still further object of this invention to provide a ball bearing assembly having improved smoothness of operation both with respect to radial and axial vibratory movements of the relatively rotating members.

The objects of this invention, generally stated, are attained by the present invention in a bearing assembly which employs a pair of members mounted upon two intermediate, axially spaced apart ball bearing assemblies for rotation of one such member relative to the other about a common longitudinal axis, with means susceptible of extremely accurate positioning included in such assembly for displacing the inner and outer bearing ball races of each such ball bearing assemblies axially substantially to the limit of their inherent end play, thereby minimizing both such end play and radial clearance. The mode of attainment of the aforesaid objects by this invention is particularly significant in the art of manufacture of instrumentation components employing miniature type ball bearings, where the unusually small dimensions involved make other more conventional means impracticable.

These and other objects, advantages, and features of novelty of this invention will be evident hereinafter.

In the accompanying drawings, wherein the presently preferred embodiments of this invention are illustrated:

FIGURE 1 is an elongated longitudinal sectional view of an assembly embodying the present invention.

FIGURE 2 is a cross sectional view taken on line 2—2 of FIGURE 1.

FIGURE 3 is a longitudinal sectional view similar to FIGURE 1, showing an alternative construction of the apparatus of the invention.

FIGURE 4 is a cross sectional view taken on line 4—4 of FIGURE 3.

FIGURE 5 is a longitudinal sectional view similar to FIGURES 1 and 3, showing another alternative construction of the apparatus of the invention.

Referring first primarily to FIGURES 1 and 2 of the drawings, the apparatus assembly of this invention is composed of four principal parts, namely, an outer, generally sleeve shaped housing or roller member 10, an inner shaft or spindle 12 positioned coaxially within the outer member 10, and a pair of ball bearing assemblies, shown generally at 14 and 16, spaced apart axially in the annular space intermediate the roller member 10 and the spindle 12 and upon which the roller member 10 and the spindle 12 are rotatable relative to one another.

The ball bearing assembly 14 is comprised of an outer inwardly facing bearing ball raceway 18 formed in the bore 22 of the roller member 10, an inner race ring 24 having a concentric, outwardly facing bearing ball raceway 26 formed therearound, and a complement of bearing balls, as shown at 28, retained between such outer and inner raceways 18 and 26. The bearing balls 28 are retained in equally, circumferentially spaced apart arrangement around the raceways by means of a conventional snap retainer ring 30. The inner race ring 24 is formed with a bore 32 making a sliding or light press fit on the outside diameter 34 of the spindle 12.

The ball bearing assembly 16 has a construction similar to the before described ball bearing assembly 14 and comprises an outer, inwardly facing bearing ball raceway groove 20 formed in the bore 22 of the roller member 10, an inner race ring 38 having a concentric, outwardly facing bearing ball raceway groove 40 formed therearound, and a complement of bearing balls, as shown at 42, retained between the raceway grooves 20 and 40, by means of a conventional snap retainer ring 44. The inner race ring 38 is formed with a bore 45 which makes a precise, light sliding fit on the before mentioned outside diameter 34 of the spindle 12. The before mentioned inner race ring 38 is restrained at a desired axial position on the spindle 12, as will be hereinafter more fully described, by means of an annular locking ring 46, the bore 48 of which is of such size as to make a tight, interference press fit on the spindle 12.

The outer open end of the bore of the roller member 10 is provided with a dished shaped closure shield 50 retained therein against an outwardly facing, annular shoulder 52 by means of a conventional snap ring 54 which makes expanding locking engagement within a snap ring groove 56 formed in the bore 22 of the roller member 10 adjacent the end thereof. The annular space between the bore 22 of the roller member 10 and the outside surface of the inner race ring 24 adjacent the opposite, spindle attachment end thereof is similarly closed by means of an annular dished edged shield member 58 which is retained in position against an annular, outwardly facing shoulder 60, by means of a conventional snap ring 62 which makes locking engagement in an annular, inwardly facing snap ring groove 64. The left hand end portion of the spindle 12, as viewed in FIGURE 1, is formed with an integral collar member 66 of increased outside diameter relative to the outside diameter 34 of the spindle 12, an adjoining section 70 of hexagonal outside configuration, and an integral, coaxially outwardly extending, threaded section 72 forming a means for threaded attachment to an apparatus member, not shown.

Referring now primarily to FIGURES 3 and 4, the apparatus assembly of this alternative version of the invention, similarly to that of FIGURES 1 and 2, is composed of four principal parts, namely, an outer, generally sleeve shaped roller member 80, an inner shaft or spindle 82 positioned coaxially within the outer roller member 80, and a pair of ball bearing assemblies, shown generally at 84 and 86, spaced apart axially in the annular space intermediate the roller member 80 and spindle 82, and by means of which the roller member 80 and spindle 82 are rotatable coaxially relative to one another.

The ball bearing assembly 84 is comprised of an outer annular race ring 88 having formed in the inner bore thereof an inwardly facing bearing ball raceway 90, an inner race ring 92 having formed in the outside cylindrical surface thereof a concentric, outwardly facing bearing ball raceway 94, and a complement of bearing balls retained, as shown at 96, between the said outer and inner raceways 90 and 94. The bearing balls 96 are retained in circumferentially equally spaced apart arrangement around the raceways by means of a conventional snap retainer ring 98. The inner race ring 92 is formed with a bore 100 of such size as to make a sliding or light press fit on the outside diameter 102 of the spindle 82. The outer race ring 88 of the bearing assembly 84 makes a snug handpress fit within a counterbore 104 extending into the left hand end of the bore 106 of the before mentioned roller member 80, as viewed in FIGURE 3.

The ball bearing assembly 86 has a construction similar to the before described ball bearing assembly 84 and comprises an outer race ring 107 having formed in the inner bore thereof a concentric, inwardly facing bearing ball raceway groove 108, an inner race ring 110 having formed in the outer cylindrical surface thereof a concentric, outwardly facing bearing ball raceway groove 112, and a complement of bearing balls, as shown at 114, retained in equally circumferentially spaced apart positions around the raceway grooves 108 and 110 by means of a conventional snap retainer ring 116. The race ring 107 makes a snug handpress fit within a counterbore 105 extending into the right hand end of the bore 106 of the roller member 80 and the bore 118 of the inner race ring 110 is of such size as to make a precise, but relatively free sliding fit on the outside cylindrical surface 102 of the spindle 82.

The before mentioned inner race ring 110 is restrained to a desired axial position on the spindle 82, as will be hereinafter more fully described, by means of an annular locking ring 120, the bore 122 of which is of such size as to make a tight interference press fit on the spindle 82.

The outer open end of the roller member 80, which is the right hand end thereof, as viewed in FIGURE 3, is provided with a dished-shaped closure shield member 124, retained against an outwardly facing, annular shoulder 126 formed in the end of a shallow counterbore adjacent the end of bore 106, by means of a conventional snap ring 128 which makes expanding locking engagement within a surrounding snap ring groove 130. The annular space between the inner and outer race rings 88 and 92 adjacent the left hand end of the roller member 80, as viewed in FIGURE 3, is closed by means of an annular dished-edged shield member 132 which is retained in position against an axially facing, annular shoulder 134 at the end of a short counterbore formed in the end of the bore of the outer race ring 88, by means of a conventional snap ring 136 which makes locking engagement in a surrounding, inwardly facing snap ring groove 138. The left hand end portion of the spindle 82, as viewed in FIGURE 3, is formed with an integral collar member 140 of increased outside diameter relative to the outside diameter 102 of the spindle 82, an integral adjoining section 142 of hexagonal outside configuration, and an integral coaxially outwardly extending threaded section 144 forming a means for threaded attachment to an apparatus member, not shown.

Referring next primarily to FIGURE 5, the elements of this alternative version of the invention are arranged substantially the reverse of those of FIGURE 1. This assembly is also composed of four principal parts, namely, an outer, generally sleeve-shaped roller member 160, an inner coaxial shaft or spindle member 162, and a pair of ball bearing assemblies, shown generally at 164 and 166, spaced apart axially in the intermediate annular space and by means of which the roller member 160 and spindle 162 are coaxially rotatable relative to one another.

The ball bearing assembly 164 is comprised of an outer annular race ring 168 having formed in the inner bore thereof a concentric, inwardly facing bearing ball raceway 170, an inner, outwardly facing bearing ball raceway 172 formed around the exterior surface 161 of the spindle 162, and a complement of bearing balls, as shown at 174, retained between such outer and inner raceways 170 and 172. The bearing balls 174 are retained in equally circumferentially spaced apart arrangement around the raceways by means of a conventional snap retainer ring 176. The outer race ring 168 of the bearing assembly 164 makes a snug handpress fit within the bore 190 of the roller member 160 and normally occupies a position with its left hand annular edge, as viewed in FIGURE 5, in abutment with an inner, axially facing annular shoulder 178 formed adjacent the left hand end portion of the bore 190 of the roller member 160.

The ball bearing assembly 166 has a construction similar to the before described ball bearing assembly 164 and comprises an outer race ring 180 having formed in the inner bore thereof a concentric, inwardly facing bearing ball raceway groove 182, an inner raceway, as shown at 184, formed around the exterior surface 161 of the spindle 162, and a complement of bearing balls 186 retained in equally, circumferentially spaced apart positions around the raceway grooves 182 and 184 by means of a conventional snap retainer ring 188. The outer race ring 180 of the bearing assembly 166 makes a precise, light press fit within the before mentioned bore 190 of the outer roller member 160 and is restrained at a desired axial position therein by means of an annular locking ring 192, the outside diameter of which is such as to make a tight interference press fit within the aforesaid bore 190 of the roller member 160.

Similar to the hereinbefore described versions of the apparatus, the right hand open end of the roller member 160, as viewed in FIGURE 5, is provided with a dished-shaped closure shield member 194 retained against an outwardly facing annular shoulder 196, formed in a short counterbore in the right hand end of the bore 190, by means of a conventional snap ring 198 which makes expanding locking engagement within a surrounding snap ring groove 200. The space between the outer race ring 168 of the bearing assembly 164 and the adjacent outside cylindrical surface 161 of the spindle 162 is closed by means of an annular dished-edge shield member 202 which is retained in position against an axially facing annular shoulder 204 formed in a short counterbore adjacent the left hand end of the bore of the outer race ring 168, by means of a conventional snap ring 206 which makes expanding locking engagement in a surrounding annular, inwardly facing snap ring groove 208. The left hand end portion of the spindle 162, as viewed in FIGURE 5, is formed with an integral collar member 210 of increased outside diameter relative to the outside diameter 161 of the spindle 162, an integral, adjoining section 212 of hexagonal outside configuration, and an integral, coaxially extending, threaded section 214, forming a means for threaded attachment to other apparatus, not shown.

The outside surfaces of the roller members 10, 80, and 160, as illustrated in FIGURES 1, 3, and 5, respectively, may have any forms required or desired for the purpose for which the apparatus of the invention is to be used. It will be noted that in FIGURE 1 the outside of the roller 10 is of plain cylindrical form, of uniform outside diameter from end to end thereof. With this particular construction, the roller 10 is adapted to the support and guidance of a recording tape, belt, or the like member having a width of any desired dimension up to a width corresponding to the entire useable length of the roller 10. Also, with this construction of roller 10, the apparatus is useable under circumstances where it may be required to support the roller 10 in a non-rotating position in an apparatus assembly and mount a drum sprocket or the like rotative element on the threaded end 72 of the spindle 12. Instead of the roller member having a plane cylindrical outside surface, as shown in FIGURE 1, it may be spool-shaped, as shown at 80 and 160 in FIGURES 3 and 5, in which cases it is provided with an intermediate cylindrical surface, as shown for example at 146, having at opposite ends thereof radial guide flanges, as shown at 148 and 150. This latter form is particularly designed as a roller for guidance of recording tape having a width substantially equal to the axial length of the plane cylindrical portion 146 thereof intermediate the guide flanges 148 and 150.

In the procedure for assembly of the before described apparatus, considering first that of FIGURES 1 and 2, the race ring 24 is first placed on the spindle 12 and positioned thereon with the left hand edge thereof in abutment with the annular shoulder 152 formed at the juncture of the spindle 12 and annular collar 66. The spindle 12 with the race ring 24 so positioned is then inserted through the previously installed annular shield member 58, and into the bore 22 of the roller member 10 to an axial position therein at which the outer and inner raceways 18 and 26 are substantially in axial alignment. Bearing balls 28 and the bearing ball snap retainer ring 30 are then installed in position in the concentric raceways 18 and 26 in conventional manner. Next, the race ring 38 is slipped over the end of spindle 12 and positioned axially thereon such that raceways 20 and 40 are in axial alignment opposite one another, and then the complement of bearing balls 42 and the snap retainer ring 44 are installed therein in conventional manner. Since the race ring 38, as before mentioned, makes a light sliding fit on the outside diameter of the spindle 12, it is easily adjusted axially on the spindle 12 to bring the raceways 20 and 40 into such axial alignment. Next, the lock ring 46 is pressed onto the end of spindle 12, and finally, the end closure shield 50 is installed in the end of the roller member 11 in position against annular shoulder 52 and locked there by snap ring 54.

Since, as before mentioned, the lock ring 46 makes a tight interference fit on the spindle 12, it is preferably pressed onto the spindle by means of a screw press having a micrometer ram adjustment, whereby the axial positioning of the lock ring 46 on the spindle 12 can be controlled with extreme accuracy. By such means, the axial positioning of the lock ring 46 on the spindle 12 can be carefully adjusted to within approximately ±0.0001" thereby determining the axial spacing between the race rings 24 and 38 with comparable accuracy. If desired, the lock ring 46 may be pressed onto the spindle 12 a distance sufficient to reduce the axial spacing between the race rings 24 and 38 either to reduce the radial and axial play through the bearings to zero or even to impart slight axial preloading to the bearings. The effect of so limiting or eliminating the axial play in the bearings, or in axial preloading the bearings, is to cause the bearing balls 42 of the bearing assembly 15 and bearing balls 28 of the bearing assembly 14 to be displaced axially and radially relative to the bottoms of their respective inner and outer raceways, thereby causing the bearing balls to track along a side portion parallel to, but away from the bottom of each of the raceways. In this manner, as is more fully described hereinafter in connection with the apparatus of FIGURES 3 and 4, the bearing balls are positioned such as to limit end play or carry a certain constant amount of axial force, thereby eliminating axial play between the bearing balls and their respective raceways which, in turn, limits or eliminates radial play and eccentricity between the spindle 12 and the roller member 10.

The procedure for assembly of the apparatus of FIGURES 3 and 4 is similar to that hereinbefore described in connection with the apparatus of FIGURES 1 and 2, except in this case, the ball bearing assembly 84 is first separately assembled in their entirety, including inner and outer race rings 88 and 92, bearing balls 96, snap retainer 98 and annular shield 132, and the whole bearing assembly placed onto the spindle 82 and positioned with the left hand edge of the race ring 92, as viewed in FIGURE 3, in abutment with the annular shoulder 154 formed at the juncture of the collar 140 and the spindle 82. Next, spindle 82 is inserted into the roller member 80 and the race ring 88 simultaneously pressed into the counterbore 104 in the bore 106 of the roller member 80. Next, the bearing assembly 86 is separately assembled in its entirety including inner and outer race rings 110 and 107 and pressed into position simultaneously in the counterbore 105 of the roller member 80 and onto the end of the spindle 82. Next, the lock ring 120 is pressed onto the outer end of spindle 82 in the same manner as hereinbefor described in connection with FIGURES 1 and 2, the lock ring 120 being thereby accurately positioned in abutment with the outer edge of the race ring 110. Such abutment with the edge of the race ring 110 is adjusted to restrain the ring or, if desired, to offset the ring axially with respect to the outer race ring 106, thereby axially offsetting the complement of bearing balls 114 axially such that they tend to track off the bottoms and along opposite side portions of the raceways 108 and 112, thereby tending to transfer an axial force component through the bearing balls to the race ring 107 in a direction toward the race ring 88. This offsetting action, in turn, tends to offset the race ring 88 and 92 axially, thereby causing the bearing balls 96 similarly to tend to track along the side portions of the raceways 90 and 94 parallel to, but away from the bottoms thereof, such as to transfer the force component axially through the bearing balls 96 from the race ring 88 to the race ring 92 in a direction toward the point of abutment of the inner race ring 92 with the annular shoulder 154 of the collar member 140. This axial force component is thence transmitted back through the spindle 82 to the lock ring 120. Thus, the end play of the spindle 82 relative to the roller member 80 can, as hereinbefore mentioned, be limited to substantially any desired amount, entirely eliminated, or even a preloaded condition established through the bearing assemblies, if desired.

Finally, after completion of the adjustment of the position of the lock ring 120, the shield member 124 is installed in the end of the roll member 80 in the same manner as described in connection with the apparatus of FIGURE 1.

The mode of assembly of the apparatus of FIGURE 5 is similar to that heretofore described in connection with the apparatus of FIGURES 1, 2, and 3. In this case, the outer race ring 168 of the ball bearing assembly 164, with the annular shield member 202 installed therein, is first inserted in the bore 196 of the roller 160 to a position in which the left hand edge of the ring is in abutment with the annular shoulder 178 of the bore 196. Next, the race ring 180 of the ball bearing assembly 166 is also inserted into the bore 190 of the roller member 160 to a position approximating that shown in FIGURE 5. Following this, the spindle 162 is inserted through the opening in the shield 202 and into the bore 190 of the roller member 160 to a position at which the inner bearing ball raceways 172 and 184 thereof are in substantial axial alignment with the bearing ball raceways 170 and 180, respectively, of the previously installed race rings 168 and 180. A complement of bearing balls is then introduced through the annular space between the spindle 182 and the bore 190 of the roller 160 and into place between the before mentioned bearing ball raceways 170 and 172, and the bearing ball retainer ring 176 is then similarly introduced and snapped into position to space the bearing balls 176 equally around the aforesaid raceways 170 and 172. Next, a complement of bearing balls 186 is similarly introduced into position between the bearing ball raceways 182 and 184 and the bearing ball retainer ring 188 installed. Following this, the locking ring 192 is inserted in the left hand end of the bore 190 of the roller member 160 and pressed axially therein to a position in abutment with the right hand edge of the race ring 180, the position of the lock ring 192 being suitably adjusted by means of the press, as hereinbefore described. Finally, after completion of the adjustment of the position of the lock ring 192, the shield member 194 is installed in the end of the roller member 160, as described in connection with the other assemblies.

The sizes of the ball bearing assemblies, such as shown at 14 and 16 in FIGURE 1 at 84 and 86 in FIGURE 3 and at 174 and 186 in FIGURE 5, are usually those generally categorized as "miniature" which in the art is generally considered to include ball bearings, the outer bearing race rings of which have outside diameters less than approximately 0.75". Under such conditions, extreme accuracy in the ball bearing assemblies is desirable, and by reason of their small sizes has heretofore been difficult, if not impossible, of attainment. The apparatus of the present invention has been found to be particularly advantageous in overcoming not only any minor inaccuracies which may occur in the construction of the bearings, but also in accomplishing the extremely delicate operation of controlling the inherent end play and eccentricity of such bearings to a very high degree of accuracy.

A particular feature of importance of this invention, especially in connection with bearing assemblies employing components categorized as "miniature" as hereinbefore mentioned, resides in utilizing the press fitted lock ring means, such as shown at 46 in FIGURE 1, at 120 in FIGURE 3, and at 190 in FIGURE 5, for effecting precision in the adjustment of lateral and end play or preloading of the bearing assembly, as contrasted with conventional means heretofore employed, namely, means usually involving the use of snap rings, shims, and the like fixed positioning devices. The latter conventional means heretofore employed required that each and every one of the components of the parts included in the ball bearing assemblies be attempted to be made with the same high degree of accuracy desired to be effected in the overall adjustment of such assemblies and, additionally, required difficult, expensive, and time consuming selective matching of the several resultant components.

As before mentioned in accordance with the present invention, the end play of the bearing assembly can be adjusted to a predetermined value within a tolerance of ±0.0001" whereas by methods and apparatus heretofore employed, a tolerance of ±0.002" to ±0.004" was the best that could be expected to be attained.

Outward adjustment of the positions or the entire removal of the lock rings 46, 120, and 192 may be accomplished by means of the use of small, wheel pulling types of extractor tools having hook-shaped gripping fingers adapted to make pulling engagement with the respective annular notch-shaped grooves 156, 158, or 193 of the lock rings shown in FIGURES 1, 3, and 5, respectively.

The foregoing is illustrative of preferred embodiments of the invention and is not to be considered as limiting, but shall include any and all variations and modifications therein which may be made by those skilled in the art within the scope of the invention as defined by the appended claims.

What is claimed is:

1. In a miniature ball bearing assembly, apparatus comprising:

a shaft;

a sleeve coaxially surrounding said shaft;

a pair of inwardly facing, axially fixedly spaced apart bearing ball raceways in said sleeve;

a pair of inner, axially spaced apart, annular race members axially slidably supported on said shaft;

an outwardly facing bearing ball raceway formed around each of said inner race members, said inner race members being normally axially positioned on said shaft such that each such outwardly facing raceway thereof is substantially concentric with one of said inwardly facing raceways;

a complement of bearing balls retained between each concentric pair of said inwardly facing and outwardly facing concentric raceways, said shaft and said sleeve being thereby supported for coaxial rotation relative to one another;

means on said shaft fixing the axial position of a first one of said inner race members with respect to axial sliding displacement thereof on said shaft in a direction away from the second one of said inner race members;

and a ring member interference press fitted on said shaft to a precise position thereon fixing the axial position of the said second one of said inner race members with respect to axial sliding displacement thereof on said shaft in a direction away from said first one of said race members, said ring member being adjusted to such position under said interference press fitted conditions on said shaft and retained at such position solely by the resultant interference press fit, thereby enabling adjustment of the bearing, without preloading thereof, to have a minute, predetermined amount of end play of the shaft and sleeve relative to one another.

2. In a miniature ball bearing assembly, apparatus comprising:

a shaft;

a sleeve coaxially surrounding said shaft;

a pair of inwardly facing, axially fixedly spaced apart bearing ball raceways in said sleeve;

a pair of inner, axially spaced apart, annular race members, axially slidably supported on said shaft;

an outwardly facing bearing ball raceway formed around each of said inner annular race members, said inner race members being normally axially positioned on said shaft such that each such outwardly facing raceway thereof is substantially concentric with one of said inwardly facing raceways;

a complement of bearing balls retained between each concentric pair of said inwardly facing and outwardly facing raceways, said shaft and said sleeve being thereby supported for coaxial rotation relative to one another;

and abutment means on said shaft limiting the maximum axial slidable separation of said inner race members, one of said abutment means including a ring member interference press fittted on said shaft, said ring member being adjustedly press positioned axially on said shaft while maintaining such fit thereon to limit said maximum axial slidable separation of said inner race members such as to provide a minute, predetermined amount of end play of the shaft and sleeve relative to one another, such limit of said slidable separation of said inner race members and said amount of end play being retained solely by such press fit of said ring member on said shaft.

3. In a miniature ball bearing assembly, apparatus comprising:

a shaft;

a sleeve coaxially surrounding said shaft;

a pair of outer, axially spaced apart, annular race members axially slidably retained in said sleeve;

an inwardly facing bearing ball raceway formed around each of said outer annular race members;

a pair of inner, axially spaced apart, annular race members, axially slidably supported on said shaft;

an outwardly facing bearing ball raceway formed around each of said inner annular race members, said inner and outer race members being normally axially positioned on said shaft and in said sleeve such that each such outwardly facing raceway thereof is substantially concentric with one of said inwardly facing raceways;

a complement of bearing balls retained between each concentric pair of said inwardly facing and outwardly facing raceways, said shaft and said sleeve being thereby supported for coaxial rotation relative to one another;

abutment means in said sleeve limiting the minimum axial slidable separation of said outer race members in said sleeve;

and abutment means on said shaft limiting the maximum axial slidable separation of said inner race members, one of said abutment means including a ring member interference press fitted on said shaft, said ring member being adjustedly press positioned axially on said shaft while maintaining such fit thereon to limit said axial slidable separation of said outer race members such as to provide a precisely predetermined amount of end play of the shaft and sleeve relative to one another such limit of said slidable separation of said outer race members being retained solely by such press fit of said ring member on said shaft.

4. In a miniature ball bearing assembly having a hollow outer member, a shaft member in said outer member, and bearing means mounting said outer member and said shaft member for coaxial rotation with controlled end play relative to one another, apparatus comprising:

a pair of axially spaced apart ball bearing means in said outer member, each such ball bearing means including an inner annular race member on said shaft member having an outwardly facing bearing ball raceway therein, and an outer annular race member contained in said outer member, having an inwardly facing bearing ball raceway therein, said raceways being substantially concentric and containing therebetween a complement of bearing balls;

means in said outer member fixing the minimum axial spacing apart of said outer annular race members;

and means interference press fitted to a position on, and retained solely at such position thereby on said shaft, for restraining said inner annular race members to limit the axial spacing apart thereof.

5. In a miniature ball bearing assembly having an outer member with a bore therein, a shaft member in said bore, and bearing means mounting said outer member and said shaft member for coaxial rotation with controlled end play relative to one another, apparatus comprising:

axially spaced apart ball bearing means in said bore between said outer memebr and said shaft member, such ball bearing means including;

a pair of inner, outwardly facing bearing ball raceways on said shaft means, a pair of outer, inwardly facing bearing ball raceways in said bore, each of said inner raceways being substantially concentric with one of said outer raceways and containing between such substantially concentric raceways a complement of bearing balls;

and positioning means limiting the axial spacing apart of the raceways of one of said pairs of raceways relative to the axial spacing apart of the raceways of the other of said pairs of raceways, said positioning means comprising ring means interference press fitted to an axially telescoping position with one of said members and retained in such position solely by the resultant interference press fit.

6. In a miniature ball bearing assembly, apparatus comprising:

a shaft;

an outer member having a bore therein coaxially surrounding said shaft;

a pair of outer, axially spaced apart, annular race members axially slidably retained in said bore;

an inwardly facing bearing ball raceway formed around each of said outer annular race members;

a pair of inner, axially spaced apart, annular raceways on said shaft;

said inner and outer raceways being normally axially positioned on said shaft and in said bore such that each such outwardly facing raceway thereof is substantially concentric with one of said inwardly facing raceways;

a complement of bearing balls retained between each concentric pair of said inwardly facing and outwardly facing raceways, said shaft and said outer member being thereby supported for coaxial rotation relative to one another;

and abutment means in said bore limiting the maximum axial slidable separation of said outer race members in said bore, said abutment means including a ring member interference press fitted in said bore into precisely positioned axial abutment with one of said race members, said ring members being retained in such position solely by the resultant interference press fit the amount of end play of the shaft and sleeve relative to one another being thereby determined.

7. In a miniature ball bearing assembly, apparatus comprising:

a shaft;

an outer member having a bore therein coaxially surrounding said shaft;

a pair of outer, axially spaced apart, annular race members axially slidably retained in said bore;

an inwardly facing bearing ball raceway formed around each of said outer annular race members;

a pair of inner, axially spaced apart, annular raceways on said shaft;

said inner and outer raceways being normally axially positioned on said shaft and in said bore such that each such outwardly facing raceway thereof is substantially concentric with one of said inwardly facing raceways;

a complement of bearing balls retained between each concentric pair of said inwardly facing and outwardly facing raceways, said shaft and said outer member being thereby supported for coaxial rotation relative to one another;

abutment means in said bore limiting the maximum axial slidable separation of said outer race members in said bore, said abutment means including a ring member interference press fitted in said bore into precisely positioned axial abutment with one of said race members, said ring member being retained in such position solely by the resultant interferences press fit, the amount of end play of the shaft and sleeve relative to one another being thereby determined;

and detachable closure means for the ends of said bore enclosing therein the aforesaid race members, raceways, bearing balls, and abutment means.

8. In a miniature ball bearing assembly, apparatus comprising:

a shaft;

a relatively thin sleeve coaxially surrounding said shaft;

a pair of inwardly facing, axially fixedly spaced apart bearing ball raceways in said sleeve;

a pair of inner, axially spaced apart, annular race members axially slidably supported on said shaft;

an outwardly facing bearing ball raceway formed around each of said inner race members, said inner race members being normally axially positioned on said shaft such that each such outwardly facing raceway thereof is substantially concentric with one of said inwardly facing raceways;

a complement of bearing balls retained between each concentric pair of said inwardly facing and outwardly facing concentric raceways, said sleeve being thereby supported for coaxial rotation relative to said shaft;

means on said shaft fixing the axial position of a first one of said inner race members with respect to axial sliding displacement thereof on said shaft in a direction away from the second one of said inner race members;

a ring member on said shaft fixing the axial position of the said second one of said inner race members with respect to axial sliding displacement thereof on said shaft in a direction away from said first one of said race members, said ring member being separate from and making a metal-to-metal interference press fit on said shaft at such position, said ring member being press positioned axially on said shaft while maintaining such metal-to-metal fit and being retained so positioned solely by such fit to determine the maximum axial separation of said inner race members on said shaft, thereby to determine the amount of end play of the shaft and sleeve relative to one another;

and a substantially disk shaped closure member detachably fitted within and extending closingly across one end of said sleeve and enclosing therein the adjacent end of said shaft and the adjacent race members, raceways, bearing balls and adjustment means.

References Cited by the Examiner
UNITED STATES PATENTS

| | | | |
|---|---|---|---|
| 1,326,892 | 12/19 | Reynolds | 308—186 X |
| 1,367,427 | 2/21 | Pierce | 308—186 |
| 1,468,134 | 9/23 | Brunner | 308—186 X |
| 1,693,538 | 11/28 | Allen | 308—186 X |
| 2,038,293 | 4/36 | Jacob | 308—191 |
| 2,082,379 | 6/37 | Brittain | 308—236 |
| 2,101,130 | 12/37 | Christman | 308—236 |
| 2,103,912 | 12/37 | Montgomery | 308—193 |
| 2,136,125 | 11/38 | Delaval-Crow | 308—236 |
| 2,502,874 | 4/50 | Moore | 308—189 |
| 2,550,908 | 5/51 | Bryant et al. | 308—189 |
| 2,728,616 | 12/55 | Potter | 308—236 X |
| 2,749,192 | 6/56 | Kort | 308—236 |
| 2,817,142 | 12/57 | Boden | 308—236 X |
| 2,953,417 | 9/60 | Horberg | 308—189 |

ROBERT C. RIORDON, *Primary Examiner.*

ARTHUR L. LA POINT, FRANK SUSKO, *Examiners.*